(12) United States Patent
Tsutsui et al.

(10) Patent No.: US 9,010,805 B2
(45) Date of Patent: Apr. 21, 2015

(54) SADDLE RIDING TYPE VEHICLE

(71) Applicant: Honda Motor Co., Ltd., Tokyo (JP)

(72) Inventors: Noriyoshi Tsutsui, Wako (JP); Tomoki Nishijima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/969,878

(22) Filed: Aug. 19, 2013

(65) Prior Publication Data

US 2014/0076948 A1 Mar. 20, 2014

(30) Foreign Application Priority Data

Sep. 20, 2012 (JP) ................................. 2012-207127

(51) Int. Cl.
*B60R 9/06* (2006.01)
*B62J 11/00* (2006.01)
*B62J 1/12* (2006.01)

(52) U.S. Cl.
CPC . *B62J 11/005* (2013.01); *B62J 1/12* (2013.01)

(58) Field of Classification Search
CPC .................................. B62J 11/005; B62J 1/08
USPC ............................ 280/288, 769; 224/413, 458
See application file for complete search history.

(56) References Cited

U.S. PATENT DOCUMENTS

| | | | | |
|---|---|---|---|---|
| 3,399,855 A | * | 9/1968 | Shirai | 280/288.4 |
| 3,604,671 A | * | 9/1971 | Walker | 248/309.1 |
| 3,779,597 A | * | 12/1973 | Uchida | 296/37.15 |
| 3,805,565 A | * | 4/1974 | McLarnon | 70/59 |
| 3,837,545 A | * | 9/1974 | Rogers, Jr. | 224/446 |
| 3,896,643 A | * | 7/1975 | Kawakami | 70/59 |
| 4,063,637 A | * | 12/1977 | Danforth | 206/8 |
| 4,438,877 A | * | 3/1984 | Jackson | 224/275 |
| 4,940,111 A | * | 7/1990 | Nogami et al. | 180/219 |
| 5,020,625 A | * | 6/1991 | Yamauchi et al. | 180/219 |
| 5,040,632 A | * | 8/1991 | Fujii et al. | 180/219 |
| 5,094,315 A | * | 3/1992 | Taki et al. | 180/219 |
| 5,127,560 A | * | 7/1992 | Miyamoto et al. | 224/413 |
| 5,127,561 A | * | 7/1992 | Miyamoto | 224/413 |
| 5,147,077 A | * | 9/1992 | Nakajima et al. | 224/413 |
| 5,531,364 A | * | 7/1996 | Buis | 224/413 |
| 5,884,825 A | * | 3/1999 | Schroeder | 224/413 |
| 6,116,064 A | * | 9/2000 | Driscoll | 70/59 |
| 6,336,579 B1 | * | 1/2002 | Sako | 224/413 |

(Continued)

FOREIGN PATENT DOCUMENTS

| | | |
|---|---|---|
| JP | S49-19961 U | 2/1974 |
| JP | S53-86758 U | 7/1978 |
| JP | 8-40336 A | 2/1996 |

*Primary Examiner* — Jeffrey J Restifo
(74) *Attorney, Agent, or Firm* — Birch, Stewart, Kolasch & Birch, LLP

(57) ABSTRACT

A saddle riding type vehicle having a vehicular helmet holder with an improved anti-theft function making it less easy to tamper with the helmet holder held on the vehicle body. A saddle riding type vehicle includes a vehicle body frame and a riding seat disposed upwardly of the vehicle body frame. The riding seat is mounted so as to be removable relative to the vehicle body frame. The saddle riding type vehicle has a helmet holder. The helmet holder includes a hook section disposed at a substantially central position in a vehicle width direction on the vehicle body frame with the hook section being capable of holding a helmet. A lateral masking section is provided for covering at least vehicle lateral outer sides of the hook section and an upward masking section for covering the hook section at least from above.

19 Claims, 7 Drawing Sheets

(56) References Cited

U.S. PATENT DOCUMENTS

| | | | |
|---|---|---|---|
| 7,562,734 B2* | 7/2009 | Yano et al. | 180/219 |
| 7,794,002 B2* | 9/2010 | Yano et al. | 296/37.15 |
| 7,866,431 B2* | 1/2011 | Ito | 180/219 |
| 8,474,565 B2* | 7/2013 | Harada | 180/219 |
| 8,499,989 B1* | 8/2013 | Ory | 224/413 |
| 8,794,687 B2* | 8/2014 | Hiwatashi | 296/37.15 |
| 2002/0053584 A1* | 5/2002 | Izawa et al. | 224/413 |
| 2003/0173386 A1* | 9/2003 | Scaccia | 224/413 |
| 2004/0118888 A1* | 6/2004 | Russell | 224/413 |
| 2005/0156000 A1* | 7/2005 | Kamemizu et al. | 224/413 |
| 2006/0180373 A1 | 8/2006 | Hanagan | |
| 2007/0261212 A1* | 11/2007 | Russell | 24/298 |
| 2008/0246315 A1* | 10/2008 | Ito | 297/215.1 |
| 2010/0084446 A1* | 4/2010 | Skillern et al. | 224/275 |
| 2012/0248733 A1* | 10/2012 | Harada | 280/281.1 |
| 2014/0076948 A1* | 3/2014 | Tsutsui et al. | 224/458 |

\* cited by examiner

SADDLE RIDING TYPE VEHICLE

CROSS-REFERENCE TO RELATED APPLICATIONS

The present application claims priority under 35 USC 119 to Japanese Patent Application No. 2012-207127 filed Sep. 20, 2012 the entire contents of which are hereby incorporated by reference.

BACKGROUND OF THE INVENTION

1. Field of the Invention

The present invention relates generally to saddle riding type vehicles. More specifically, to a saddle riding type vehicle having a vehicular helmet holder.

2. Description of Background Art

Saddle riding type vehicle riders wear a helmet when riding the vehicle. When getting off the vehicle, the riders often store the helmet in the vehicle or fix and hold the helmet onto the vehicle. A known helmet holding structure includes a locking device operable with a key. Since such locking devices have a complicated mechanism and are expensive, a technique incorporating a simple latching hook has been developed, as disclosed, for example, in Japanese Patent Laid-Open No. Hei 8-40336. The structure disclosed in Japanese Patent Laid-Open No. Hei 8-40336 includes a helmet latching hook disposed on a rear portion vehicle body frame above which an openable riding seat is placed. The structure further includes a cushion member disposed at a seat bottom on the lower surface of the riding seat, so that the cushion member abuts on an apex of the helmet latching hook when the riding seat is in a closed position.

The arrangement in which the cushion member at the seat bottom abuts on the vertex of the helmet latching hook prevents a helmet hooked onto the helmet latching hook from being removed, thus enhancing an anti-theft function.

The helmet holder disclosed in Japanese Patent Laid-Open No. Hei 8-40336, having a relatively simple structure for hooking the helmet onto the hook, is advantageous in terms of manufacturing cost. The helmet latching hook on the vehicle body frame is, however, disposed on a vehicle body lateral side and is thus easy to spot and within easy reach. It is easy to tamper with the helmet hooked onto the helmet latching hook.

SUMMARY AND OBJECTS OF THE INVENTION

An embodiment of the present invention has been made in view of the foregoing situation. It is an object of an embodiment of the present invention to provide a saddle riding type vehicle having a vehicular helmet holder with an improved anti-theft function. It is less easy to tamper with the helmet holder held on a vehicle body.

According to an embodiment of the present invention, a saddle riding type vehicle is provided having a helmet holder. The saddle riding type vehicle includes a vehicle body frame and a riding seat disposed upwardly of the vehicle body frame. The riding seat is mounted so as to be removable relative to the vehicle body frame. The helmet holder includes a hook section disposed at a substantially central position in a vehicle width direction on the vehicle body frame with the hook section being capable of holding a helmet. A lateral masking section is provided for covering at least vehicle lateral outer sides of the hook section with an upward masking section for covering the hook section from above.

According to an embodiment of the present invention, the lateral masking section is formed integrally with a seat bottom plate of the riding seat.

According to an embodiment of the present invention, the riding seat includes a front seat disposed on a forward side of the vehicle and a rear seat disposed on a rearward side of the vehicle. The front seat and the rear seat being disposed on vertical levels different from each other with the hook section being disposed between the front and rear seats. The lateral masking section is formed on one of the front or rear seat whichever is disposed on a lower level with the upward masking section being formed on one of the front or rear seat whichever is disposed on a higher level.

According to an embodiment of the present invention, the hook section is disposed on a cross member extending in the vehicle width direction of the vehicle body frame.

According to an embodiment of the present invention, the lateral masking section is covered in a vehicle body cover on the vehicle lateral outer sides.

According to an embodiment of the present invention, the saddle riding type vehicle further includes support sections disposed on both vehicle lateral sides of the hook section. The support sections each include a front seat mounting portion on which the front seat is mounted, a rear cover mounting portion on which a rear cover is mounted and a rear seat inserting portion over which the rear seat is inserted.

According to an embodiment of the present invention, the support sections are each formed by bending a plate-like member.

According to an embodiment of the present invention, the hook section is disposed adjacent to a removal side upper portion of an anti-theft U-shaped lock.

According to an embodiment of the present invention, the lateral masking section is formed integrally with the support sections on which the riding seat is mounted.

According to an embodiment of the present invention, the hook section is less easy to be accessed and tampered with in view of the positioning of the hook section for holding the helmet being disposed at a substantially central position in the vehicle width direction. In addition, the lateral masking section for covering the vehicle lateral outer sides of the hook section and the upward masking section for covering the hook section from above allow the hook section to be hidden. This makes it even more difficult to access the hook section, thus enhancing tamper prevention and anti-theft effects.

According to an embodiment of the present invention, the riding seat forms part of the lateral masking section. This achieves an improved anti-theft effect without having to increase the number of parts used.

According to an embodiment of the present invention, the hook section is disposed between the front and rear seats separated into respective ones in the vehicle longitudinal direction and disposed at two different levels, one being higher than the other. The seat at the higher level can thus be used as the upward masking section. In addition, removal of the seat at the higher level allows the hook section to be accessed, so that no special opening needs to be formed for accessing the hook section.

According to an embodiment of the present invention, the hook section is disposed on the cross member. The hook section can thus be easily disposed at the center in the vehicle width direction and mounted firmly.

According to an embodiment of the present invention, the hook section is covered double on its both lateral sides in the lateral masking section and on its outside in the vehicle body cover. This makes tamper prevention and anti-theft effects even more reliable.

According to an embodiment of the present invention, the support sections on which the riding seat is mounted include mounting portions for a plurality of members, including the front seat mounting portion, the rear cover mounting portion, and the rear seat inserting portion. This eliminates the need for having mounting portions for the multiple members, thus decreasing the number of parts used.

According to an embodiment of the present invention, the support sections are each formed by bending a plate-like member, which facilitates formation of flat portions including the front seat mounting portion, the vehicle body rear cover mounting portion, and the rear seat inserting portion.

According to an embodiment of the present invention, the removal side upper portion of the anti-theft U-shaped lock and the hook section are disposed adjacent to each other. When the hook section is exposed during an operation of locking the helmet, the anti-theft U-shaped lock is also to be pulled out, which achieves greater ease of use.

According to an embodiment of the present invention, the lateral masking section that covers the vehicle lateral sides of the hook section is formed with the support sections on which the riding seat is mounted. This enables lateral masking with a simple structure without requiring any special members. Furthermore, the support sections, having a wide structural portion for masking the lateral sides of the hook section, offers enhanced stiffness.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
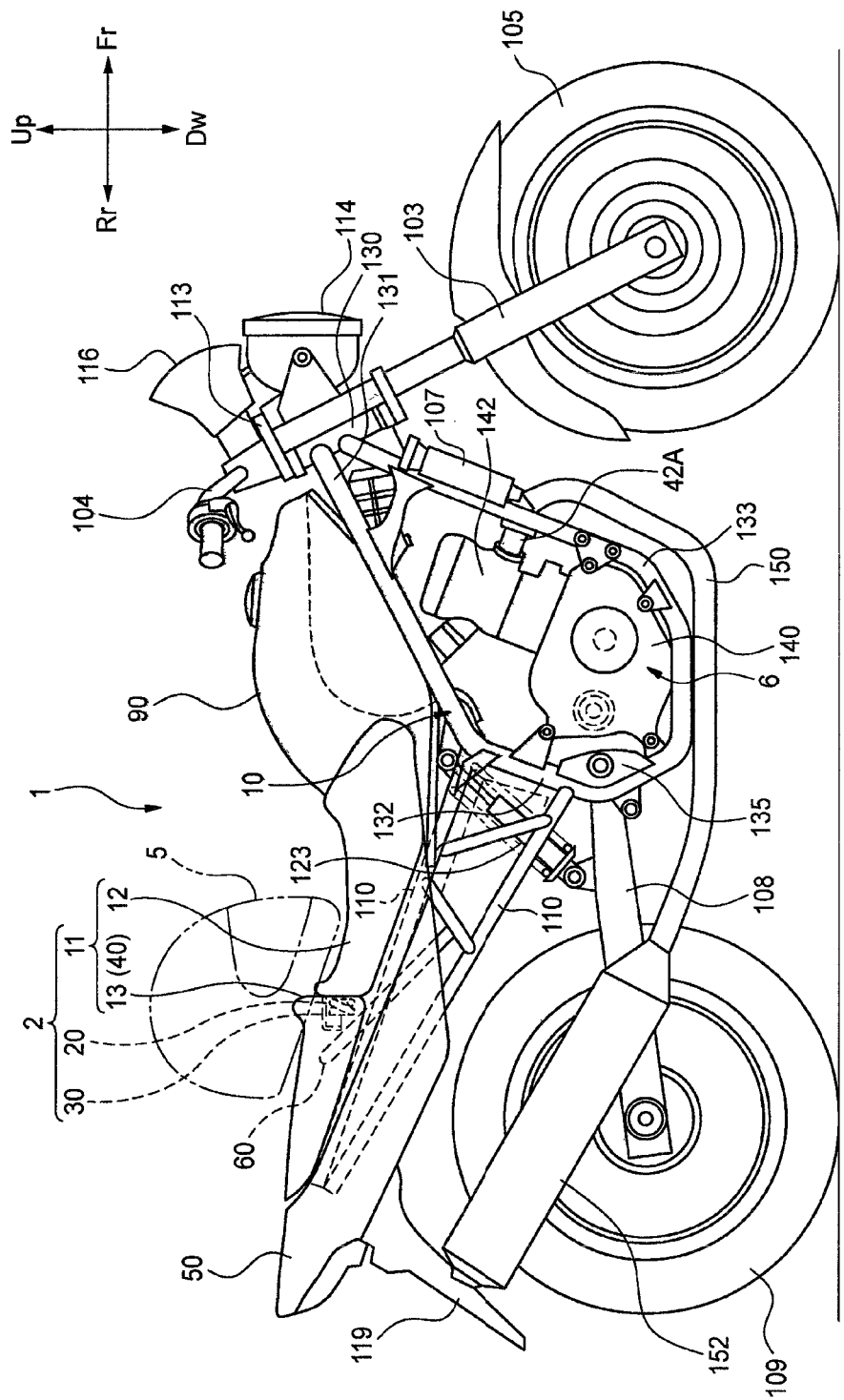
FIG. 1 is a right side elevational view showing a motorcycle having a helmet holder according to a first embodiment of the present invention.

Specific embodiments to which the present invention is applied will be described below.

A motorcycle as a saddle riding type vehicle according to a first embodiment of the present invention will be described in detail below with reference to FIGS. 1 to 6.

The drawings should be viewed in the direction of reference numerals. The drawings show arrows to indicate directions relative to an operating direction of the motorcycle, an arrow Up denoting a vehicle upward direction, an arrow Dw denoting a vehicle downward direction, an arrow L denoting a vehicle leftward direction, an arrow R denoting a vehicle rightward direction, an arrow Fr denoting a vehicle forward direction, and an arrow Rr denoting a vehicle rearward direction, respectively.

General arrangements of a motorcycle 1 according to the present embodiment will be described below with reference to FIG. 1.

As shown in FIG. 1, the motorcycle 1 includes a vehicle body frame 10, a pair of left and right front forks 103, a steering handlebar 104, a front wheel 105, an engine 6, a radiator 107, a swing arm 108, a rear wheel 109, a rear shock absorber 123, a fuel tank 90, and a riding seat 11. Specifically, the front forks 103 are rotatably supported at a front portion of the vehicle body frame 10. The handlebar 104 is attached to a top bridge 113 of the front forks 103. The front wheel 105 is rotatably supported by the front forks 103. The engine 6 is supported on the vehicle body frame 10 substantially at a center of the vehicle body. The radiator 107 is disposed forwardly of the engine 6. The swing arm 108 is vertically swingably supported on a rear end of the engine 6 and the vehicle body frame 10. The rear wheel 109 is rotatably supported at a rear end portion of the swing arm 108. The rear shock absorber 123 is disposed between the swing arm 108 and the vehicle body frame 10. The fuel tank 90 is disposed at an upper portion of the vehicle body frame 10. The riding seat 11 is disposed rearwardly of the fuel tank 90. The riding seat 11 includes a front seat 12 in which a rider sits and a rear seat 13 in which a passenger sits.

A headlight 114 and meters 116 are mounted on an upper portion of the front forks 103 via brackets as appropriate.

In addition, a rear cover 50 and a rear fender 119 as part of vehicle body covers are mounted on a rear portion of the vehicle body frame 10. A taillight, a direction indicator, and other parts are mounted on the rear fender 119.

The vehicle body frame 10 includes a pair of left and right main pipes 131, a pair of left and right middle frames 132, and a pair of left and right down tubes 133. More specifically, the main pipes 131 extend rearwardly along the vehicle body from a head pipe 130. The middle frames 132 extend obliquely downwardly along the vehicle body from the main pipes 131 toward a pivot plate portion 135 that swingably supports the swing arm 108 for supporting the rear wheel 109. The down tubes 133 extend from the head pipe 130 downwardly along the vehicle body under the main pipes 131 and further extend rearwardly along the vehicle body.

The down tubes 133, after extending rearwardly, further extend obliquely upwardly along the vehicle body toward the pivot plate portion 135. The pivot plate portion 135 is then joined to the down tubes 133 and the middle frames 132. In addition, pairs of left and right seat rails 110, 110 that extend rearwardly from the middle frames 132 are connected. The pairs of left and right seat rails 110, 110 are composed of the seat rails 110, 110 on each lateral side, the seat rails 110, 110 on one lateral side including two tubes spaced apart from each other vertically and having the space narrowing toward the rear of the vehicle. The seat rails 110, 110 are structured to support the riding seat 11 and the rear cover 50 as part of the vehicle body covers.

The vehicle body frame 10 further includes cross members disposed as appropriate and the cross members enhance stiffness of the vehicle body frame 10.

An output of the engine 6 of the motorcycle 1 according to the present embodiment is transmitted to the rear wheel 109 via sprockets (not shown) and a drive chain trained over the sprockets.

An exhaust pipe 150 is connected to an exhaust port 42A disposed on the front surface side of a cylinder head 142. The exhaust pipe 150 extends from the exhaust port 42A downwardly along the vehicle body, further extends under a crankcase 140 rearwardly along the vehicle body, and turns to the right side of the vehicle in front of the rear wheel 109. A muffler 152 that extends along the right-hand side of the rear wheel 109 is connected to the exhaust pipe 150.

A construction of a helmet holder 2 will be described below with reference also to FIGS. 2 to 6.

The helmet holder 2 according to the present embodiment holds in place and stores a helmet 5 when the rider gets off the vehicle. The helmet holder 2 includes a hook section 20, a lateral masking section 30, and an upward masking section 40 to be described later. The helmet holder 2 is structured, as will be later described, to enhance tamper prevention and anti-theft functions of the helmet 5 locked onto the vehicle body.

The hook section 20 of the helmet holder 2 will be described below.

In the present embodiment, the hook section 20 is disposed on the vehicle body frame 10 at a lower side (see FIGS. 1 and 2) of the rear seat 13 of the riding seat 11. It is noted that, in the present embodiment, the riding seat 11 includes, as described earlier, the front seat 12 and the rear seat 13 and the rear seat 13 removably mounted on the vehicle body frame 10. Removing the rear seat 13 exposes the hook section 20.

Figure 4:
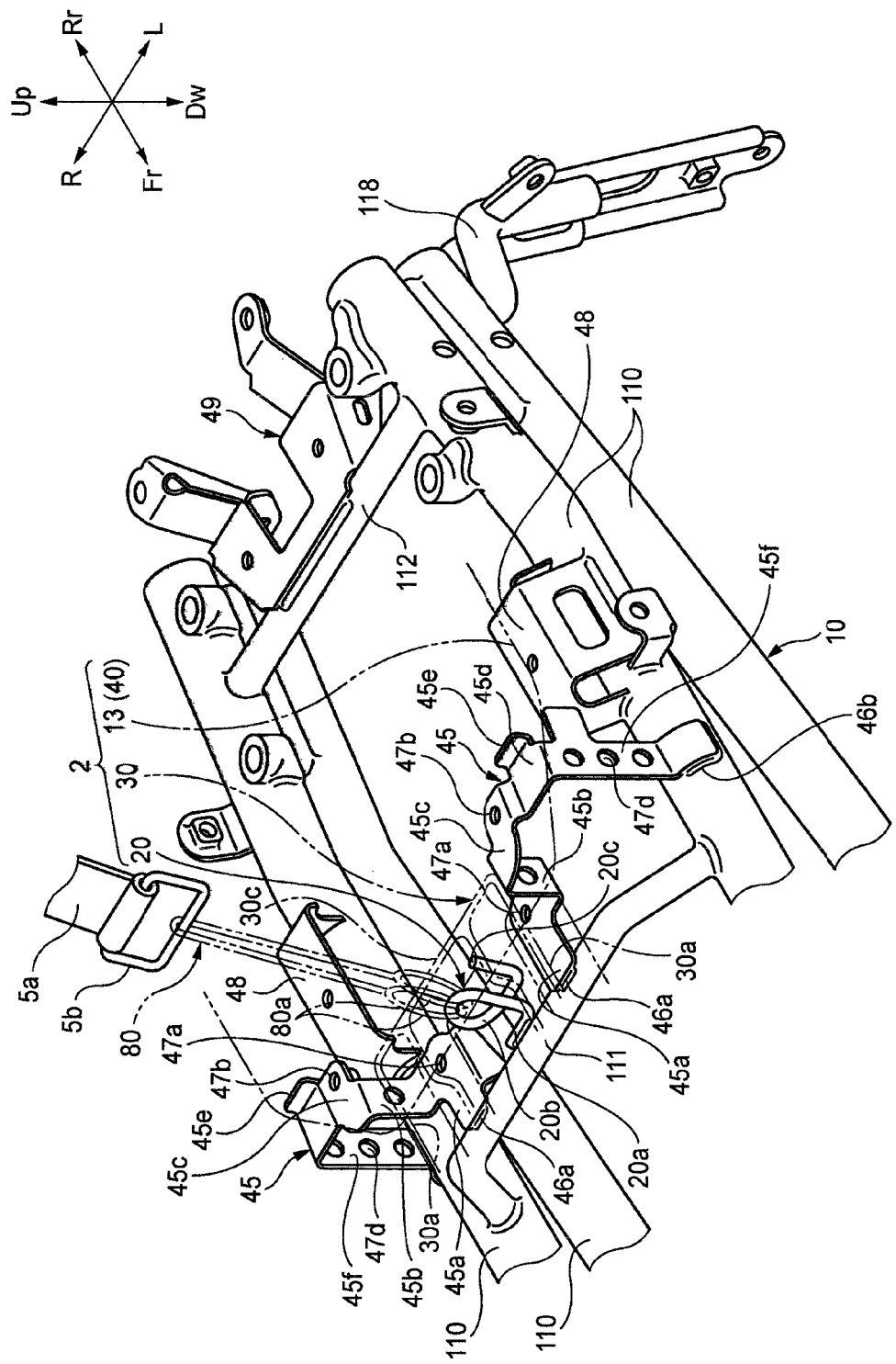
FIG. 4 is a perspective view showing a main section of a vehicle body frame of the motorcycle according to the first embodiment of the present invention.

The hook section 20 is structured such that a chinstrap 5a of the helmet 5 can be hooked via an attaching wire 80 (see FIG. 4). More specifically, for example, referring to FIG. 4, the hook section 20 is formed to include a circular portion 20b that rises upwardly from a welded portion 20a and is wound into a coil of one and a half turn to thereby have a leading end portion 20c facing upwardly.

The attaching wire 80 for mounting the helmet 5 can be passed though and hooked onto the circular portion 20b. When, for example, the rider gets off and leaves the vehicle, he or she can tie the helmet 5 to the hook section 20 and place the helmet 5 on the riding seat 11 (see FIG. 1).

The hook section 20 is fixed to the vehicle body frame 10 through, for example, welding. In the present embodiment, the hook section 20 is welded to a cross member 111 (see FIG. 4) extending in a vehicle width direction across the left and right seat rails 110, 110 disposed downwardly of the riding seat 11. The hook section 20 is welded at a substantially central position in the vehicle width direction rearward of the cross member 111.

Disposing the hook section 20 at the cross member 111 as described above facilitates placing the hook section 20 centrally in the vehicle width direction. In addition, the disposition of the hook section 20 at the cross member 111 enables firm and steady mounting.

The lateral masking section 30 of the helmet holder 2 will be described below.

Figure 2:
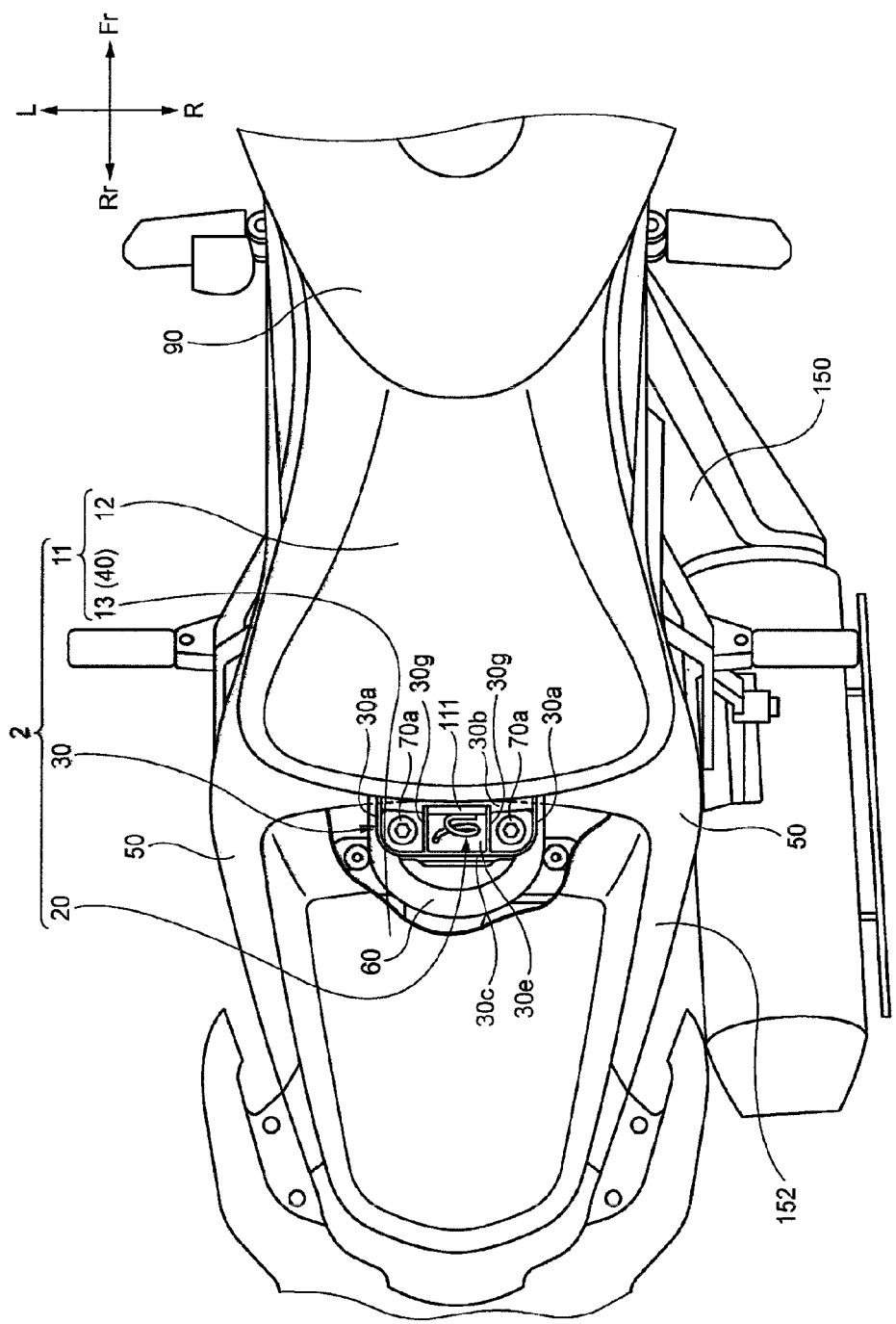
FIG. 2 is a partly cut-away plan view showing a main section viewed from the upper side of the motorcycle shown in FIG. 1.
Figure 3:
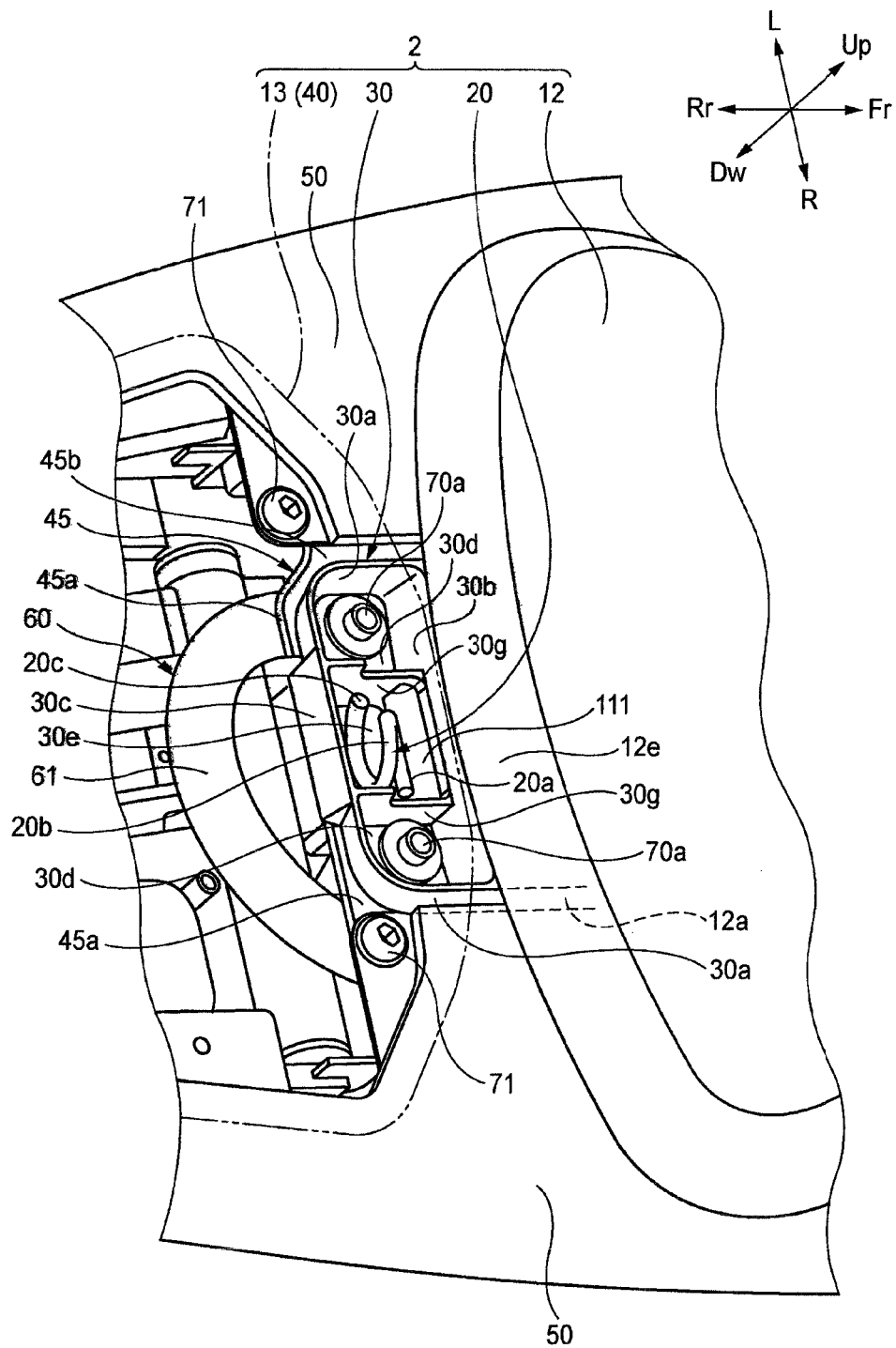
FIG. 3 is a perspective view showing a main section of the motorcycle according to the first embodiment of the present invention.

As shown in FIGS. 2 and 3, the lateral masking section 30 according to the present embodiment includes lateral walls 30a, 30a that cover at least lateral sides of the hook section 20. The lateral masking section 30 according to the present embodiment is shaped like a rectangular container including, in addition to the lateral walls 30a, 30a, a forward wall 30b that covers a forward side, a rearward wall 30c that covers a rearward side, a bottom wall 30d, and a substantially rectangular opening 30e partitioned by inner side walls 30g, 30g.

In addition, the lateral masking section 30 according to the present embodiment is formed integrally with, and rearwardly of, a seat bottom plate 12a (see FIGS. 3 and 5) of the front seat 12. The lateral masking section 30 is extended toward the rear of the vehicle in a condition of protruding from a rear end portion 12e of the front seat 12.

The lateral masking section 30, in its mounted position, is fixed in place to a front seat mounting portion 45a (see FIG. 4) of a support section 45 with fixing screws 70a, 70a tightened through the bottom walls 30d, 30d on both lateral sides of the opening 30e. Under this condition, the hook section 20 is located inside the opening 30e. Consequently, the lateral masking section 30 is disposed so as to surround both lateral sides and front and rear of the hook section 20 at a position rearward of the front seat 12.

The upward masking section 40 of the helmet holder 2 will be described below.

Figure 5:
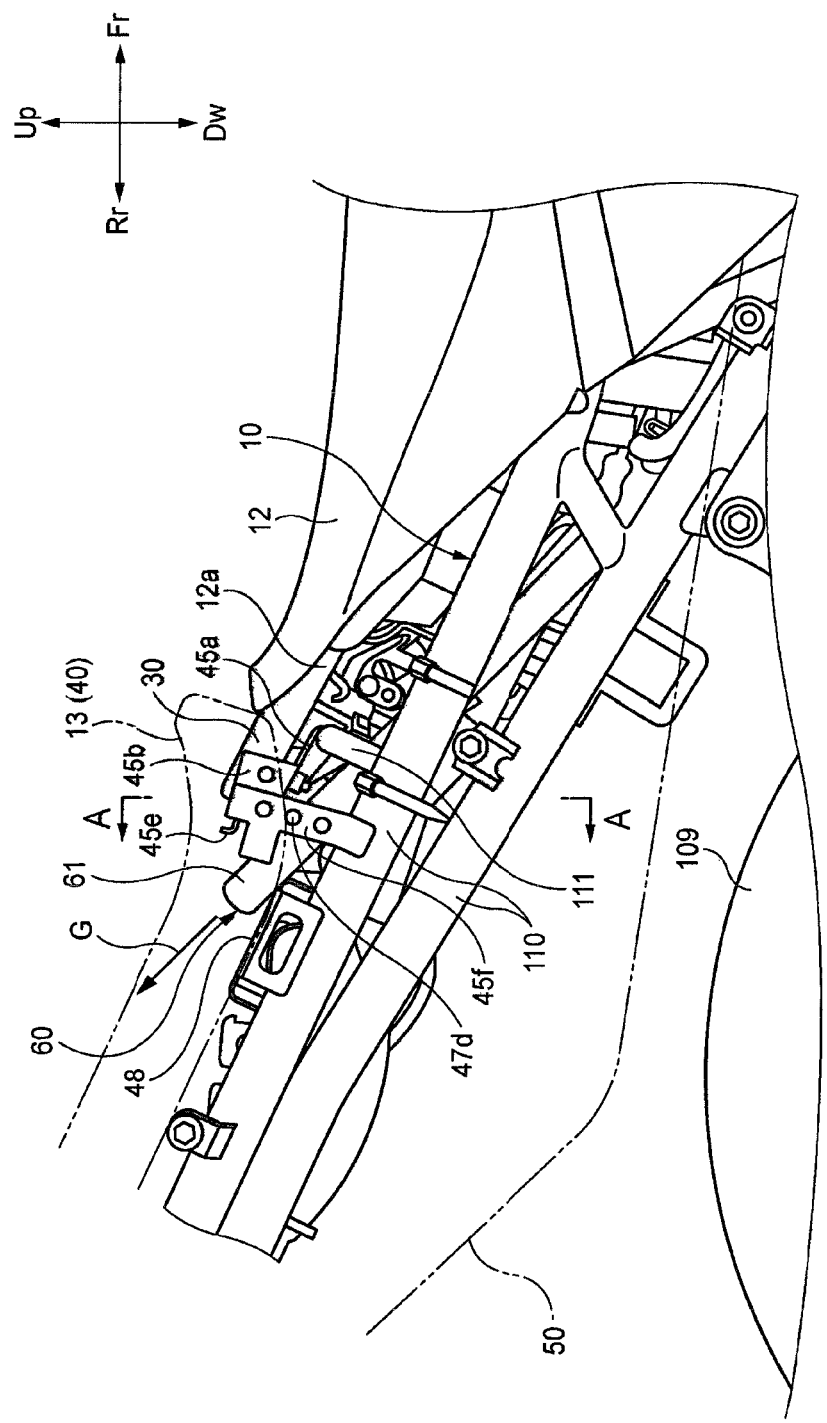
FIG. 5 is a side elevational view showing a main section of the motorcycle according to the first embodiment of the present invention, from which a rear seat and a vehicle body cover are removed.

Referring to FIGS. 1 and 5, in the present embodiment, the riding seat 11 is disposed such that the rear seat 13 on the rearward side of the vehicle is on a level higher in a vehicle height direction than the front seat 12 on the forward side of the vehicle. The rear seat 13, being disposed on a level upward of the front seat 12 as described above, has a forward portion of the rear seat 13 disposed so as to cover the hook section 20 from above, relative to the hook section 20 disposed rearwardly of the rear end portion 12e of the front seat 12, as shown in FIGS. 2 and 5. More specifically, the forward portion of the rear seat 13 functions as the upward masking section 40 for covering the hook section 20 from above (see FIGS. 3 and 6).

Figure 6:
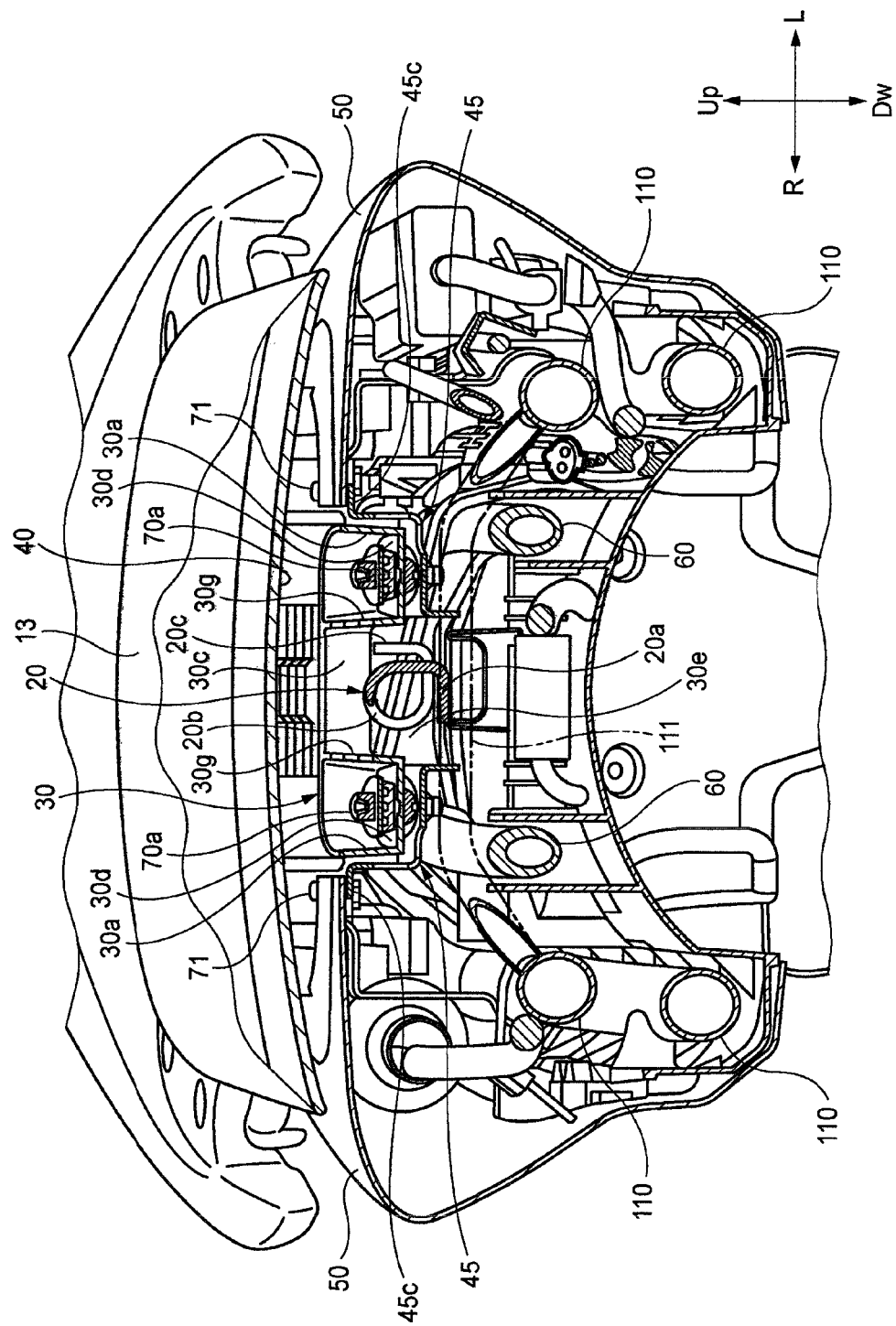
FIG. 6 is a schematic cross-sectional view taken along line A-A in FIG. 5.

As shown in FIGS. 1 and 6, in the present embodiment, the lateral masking section 30 has vehicle lateral outer sides covered in a vehicle body cover, for example, the rear cover 50. The rear cover 50 is, for example, fixed in place with screws 71, 71 at positions close to the lateral walls 30a, 30a of the lateral masking section 30 to thereby cover the lower side of the riding seat 11 substantially horizontally. The rear cover 50 also bulges largely so as to enclose therein the left and right seat rails 110, 110 including the underside thereof. Thus, in the present embodiment, the hook section 20 is covered double on its both lateral sides in the lateral masking section 30 and the rear cover 50 disposed on the outside of the lateral masking section 30.

Referring now to FIG. 4, the support section 45 on which the lateral masking section 30, the rear seat 13, and the rear cover 50 are mounted will be described below.

A pair of left and right support sections 45, 45 is disposed upwardly of the seat rails 110, 110 and supports the lateral masking section 30, the rear seat 13, and the rear cover 50. The pair of left and right support sections 45, 45 is configured as a pair of left and right mounting stays, each having a first end welded to the cross member 111 to which the hook section 20 is welded and a second end welded to the seat rail 110.

The support sections 45, 45 are each formed by bending a plate-like member. Each of the support sections 45, 45 includes the front seat mounting portion 45a, a riser portion 45b, a rear cover mounting portion 45c, a flat portion 45d, and a rear seat inserting portion 45e. More specifically, the front seat mounting portion 45a extends rearwardly along the vehicle in a substantially horizontal direction from a welded portion 46a disposed at a position closest to the center of the vehicle. The riser portion 45b rises upwardly from the front seat mounting portion 45a. The rear cover mounting portion 45c extends slightly rearwardly in a substantially horizontal direction from the riser portion 45b. The flat portion 45d is bent slightly downwardly from the rear cover mounting portion 45c and extends outwardly in the vehicle. The flat portion 45d has a rear end side rising upwardly to form the rear seat inserting portion 45e. Further, the flat portion 45d has an outer end extending downwardly toward the seat rail 110 and a leading end welded and fixed to the seat rail 110 at a welded portion 46b.

The front seat mounting portions 45a, 45a have threaded holes 47a, 47a having internal threads with which the fixing screws 70a, 70a threadedly engage. The rear cover mounting portions 45c, 45c have threaded holes 47b, 47b having internal threads with which the screws 71, 71 for fixing the rear cover 50 threadedly engage.

Outside riser portions 45f, 45f each have a plurality of openings 47d formed therein as shown in FIG. 4. The outside riser portions 45f, 45f are formed as such to reduce the weight and for use in attaching any other member, for example, a harness.

As described above, the support section 45 is configured as a multifunctional mounting section including a plurality of mounting portions, such as the front seat mounting portion 45a on which the lateral masking section 30 is formed integrally with the seat bottom plate 12a of the front seat 12, the rear cover mounting portion 45c on which the rear cover 50 is mounted, the rear seat inserting portion 45e over which the rear seat 13 is inserted and fixed in position, and the openings 47d.

Seat bearing portions 48, 48 for bearing a bottom surface of the rear seat 13 are disposed rearwardly of the support sections 45, 45. A seat catch 49 is disposed on a rear end cross member 112 at an extreme rear end portion of the seat rails 110, 110. The rear seat 13 is thus held and fixed in place by these seat bearing members and can be removed as necessary. In addition, a rear fender frame 118 extending downwardly is disposed at a rear end of the seat rails 110, 110.

The present embodiment is configured to house an anti-theft U-shaped lock 60 at a position close to the hook section 20. The anti-theft U-shaped lock 60 is stored immediately below the hook section 20 in a condition of being inclined downwardly toward the front in the vehicle longitudinal direction. The anti-theft U-shaped lock 60 thus has an upper portion 61 disposed rearwardly of the lateral masking section 30 and under the rear seat 13 in a condition of being close to the hook section 20.

Use of the helmet holder 2 according to the present embodiment will be described.

To use the helmet holder 2, the rear seat 13 is first removed from the vehicle body by performing an operation, such as removing the rear seat 13 from the rear seat inserting portion 45e. Performing this operation exposes the hook section 20 as shown in FIG. 3.

Next, with the hook section 20 exposed and with the attaching wire 80 passed through a buckle 5b of the chinstrap 5a of the helmet 5, leading end ring portions 80a, 80 of the attaching wire 80 are passed from the leading end portion 20c of the hook section 20 and hooked at the circular portion 20b of the hook section 20.

When the hook section 20 is exposed, the anti-theft U-shaped lock 60 can be pulled out rearwardly and upwardly of the vehicle. When the vehicle needs to be locked, therefore, the anti-theft U-shaped lock 60 can be pulled out (in the direction of an arrow G in FIG. 5) and used.

After the attaching wire 80 has been hooked onto the hook section 20, an operation is performed, such as inserting the rear seat 13 into the rear seat inserting portion 45e to thereby return the rear seat 13 to its original position. This operation results in the attaching wire 80 being pulled out from a space between the front seat 12 and the rear seat 13, so that the helmet 5 can be held, for example, in a condition of being placed on the riding seat 11 (see FIG. 1).

It is noted that, in the present embodiment, an arrangement may be made to make the rear seat 13 lockable with a key.

As described above, in the present embodiment, when the helmet 5 is mounted and held in position, it is less easy to access and tamper with the hook section 20 when the hook section 20 is disposed at a substantially central position in the vehicle width direction.

In addition, the hook section 20 is covered double on both lateral sides in the lateral masking section 30 and on its outside in the rear cover 50 of the hook section 20. The hook section 20 is further covered on its upward side in the rear seat 13 that functions as the upward masking section 40 and is hidden with no clearance. In addition, the attaching wire 80 is pulled out from a space between the front seat 12 and the rear seat 13 with no clearance therebetween. It is therefore extremely difficult to access the fixed portion of the attaching wire 80, thus achieving extremely great tamper prevention and anti-theft effects.

In addition, the rear seat 13 functions as the upward masking section 40. This eliminates the need for any special part for hiding the hook section 20, thus improving the anti-theft effect without having to increase the number of parts used.

The present embodiment uses the hook section 20 disposed under the rear seat 13 configured to be openable between the front seat 12 and the rear seat 13 disposed in tandem in the vehicle longitudinal direction. This eliminates the need for forming any special opening for accessing the hook section 20. In addition, the operation of removing the rear seat 13 that assumes the upward masking section 40 provides a large exposed area including the hook section 20 and its surrounding parts. This facilitates operations of hooking the helmet 5 onto, and removing the helmet 5 from, the hook section 20.

In the present embodiment, the lateral masking section 30 is formed integrally with the seat bottom plate 12a of the front seat 12. This eliminates the need for any special part and thus achieves an improved anti-theft effect without having to increase the number of parts used.

The present embodiment includes the support section 45 that includes the front seat mounting portion 45a, the rear cover mounting portion 45c, and the rear seat inserting portion 45e and a plurality of members can be mounted on the support section 45. This decreases the number of parts used. In addition, the support section 45 is formed by bending a plate-like member, which facilitates the formation of flat portions including the front seat mounting portion 45a, the rear cover mounting portion 45c, and the rear seat inserting portion 45e.

In the first embodiment of the present invention, the anti-theft U-shaped lock 60 and the hook section 20 are adjacent to each other. When the hook section 20 is exposed during, for example, an operation of locking the helmet 5, the anti-theft U-shaped lock 60 is also to be pulled out, which achieves greater ease of use.

Figure 7:
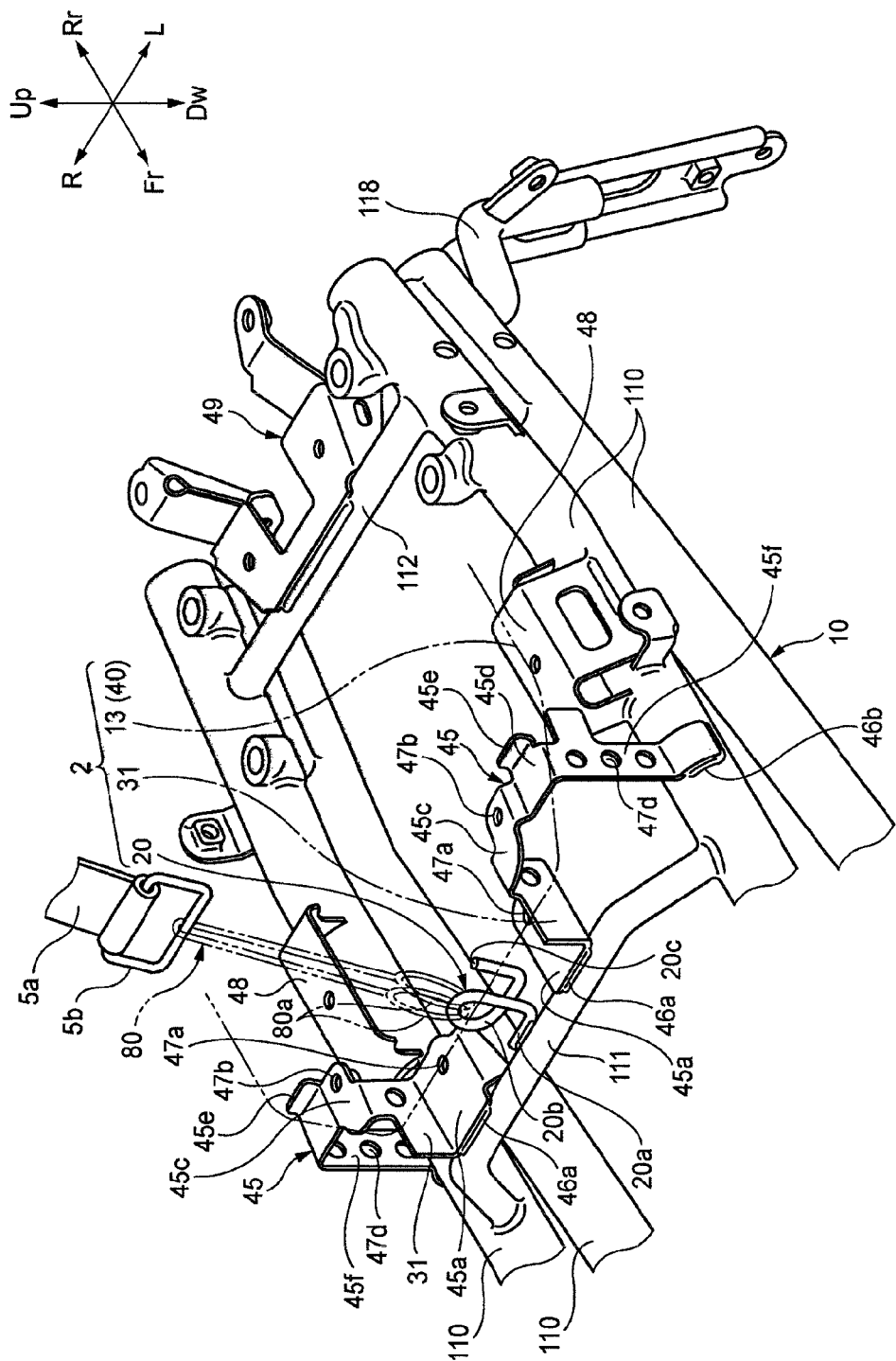
FIG. 7 is a perspective view showing a main section of a vehicle body frame in a motorcycle according to a second embodiment of the present invention.

A second embodiment of the present invention will be described below with reference to FIG. 7.

Like or corresponding parts are identified by the same reference numerals as those used for the first embodiment of the present invention and descriptions for those parts will be omitted.

In the present embodiment, a hook section 20 is disposed on a cross member 111 similarly to the first embodiment of the present invention and an upward masking section 40 for covering the hook section 20 from above is configured similarly to that of the first embodiment of the present invention. The second embodiment of the present invention differs from the first embodiment of the present invention in a construction of lateral masking sections 31, 31 that cover vehicle lateral sides of the hook section 20.

The riser portions 45b, 45b of the support sections 45, 45 in the first embodiment of the present invention are adapted to be wider in the vehicle longitudinal direction to serve as the lateral masking sections 31, 31 according to the present embodiment. More specifically, the lateral masking sections 31, 31 correspond to the lateral walls 30a, 30a that cover the lateral sides of the hook section 20 in the lateral masking section 30 of the first embodiment and are structured to prevent access to the hook section 20 from lateral directions. Consequently, in the present embodiment, a front seat 12 has a mounting portion that has no lateral masking section 30 of the first embodiment fastened to front seat mounting portions 45a, 45a.

As described above, in the present embodiment, the lateral masking sections 31, 31 that cover the vehicle lateral sides of the hook section 20 are formed at the support section 45 for holding a riding seat 11. Lateral masking can thus be provided with a simple structure without requiring any special members. In addition, the support section 45, having the structural portion for masking the lateral sides of the hook section 20, is shaped to have a wide portion for enhanced stiffness.

In the embodiments of the present invention described above, the rear seat 13 is openably disposed on a level upward of the front seat 12. Nonetheless, in the present invention, the front seat 12 may be openably placed on a level higher than the rear seat 13 and the upward masking section may be disposed on the front seat side. In addition, in each of the above embodiments, the hook section 20 is wound into a coil of one and a half turn. This is, however, not the only possible arrangement and any of various other shapes may be used in the present invention. In each of the above embodiments, the riding seat 11 is used as the upward masking section 40. This is, however, not the only possible arrangement; alternatively, for example, the rear cover 50 as part of the vehicle body covers may be used for the upward masking section 40. More specifically, the present invention can also be applied to a motorcycle having no so-called passenger's seat, in which the rear cover 50 is adapted to be openable and used for covering in place of the rear seat 13 in the embodiments of the present invention described above.

The foregoing embodiments have been exemplarily described for a motorcycle. The present invention can nonetheless be applied, for example, to other types of saddle riding type vehicles, including three-wheeled and four-wheeled buggies.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A saddle riding vehicle having a helmet holder, comprising:
    a vehicle body frame; and
    a riding seat disposed upwardly of the vehicle body frame, the riding seat being mounted so as to be removable relative to the vehicle body frame, the helmet holder comprising:
    a hook section disposed at a substantially central position in a vehicle width direction on the vehicle body frame, the hook section being capable of holding a helmet;
    a lateral masking section for covering at least vehicle lateral outer sides of the hook section; and
    an upward masking section for covering the hook section from above,
    wherein the riding seat includes a front seat disposed on a forward side of the vehicle and a rear seat disposed on a rearward side of the vehicle, the front seat and the rear seat being disposed on vertical levels different from each other, the hook section being disposed between the front and rear seats; and
    the lateral masking section is formed on one of the front or rear seat whichever is disposed on a lower level, and the upward masking section is formed on one of the front or rear seat whichever is disposed on a higher level.

2. The saddle riding vehicle according to claim 1, wherein the lateral masking section is formed integrally with a seat bottom plate of the riding seat.

3. The saddle riding vehicle according to claims 2, wherein the hook section is disposed on a cross member extending in the vehicle width direction of the vehicle body frame.

4. The saddle riding vehicle according to claim 2, wherein the lateral masking section is covered in a vehicle body cover on the vehicle lateral outer sides.

5. The saddle riding vehicle according to claim 2, wherein the hook section is disposed adjacent to a removal side upper portion of an anti-theft U-shaped lock.

6. The saddle riding vehicle according to claim 2, wherein the lateral masking section is formed integrally with the support sections on which the riding seat is mounted.

7. The saddle riding vehicle according to claims 1, wherein the hook section is disposed on a cross member extending in the vehicle width direction of the vehicle body frame.

8. The saddle riding vehicle according to claim 7, and further including:
    support sections disposed on both vehicle lateral sides of the hook section, the support sections each including:
    a front seat mounting portion for mounting the front seat;
    a rear cover mounting portion on which a rear cover is mounted; and
    a rear seat inserting portion over which the rear seat is inserted.

9. The saddle riding vehicle according to claim 1, wherein the lateral masking section is covered in a vehicle body cover on the vehicle lateral outer sides.

10. The saddle riding vehicle according to claim 1, and further including:
    support sections disposed on both vehicle lateral sides of the hook section, the support sections each including:
    a front seat mounting portion for mounting the front seat;
    a rear cover mounting portion on which a rear cover is mounted; and
    a rear seat inserting portion over which the rear seat is inserted.

11. The saddle riding vehicle according to claim 10, wherein the support sections are each formed by bending a plate-like member.

12. The saddle riding vehicle according to claim 1, wherein the hook section is disposed adjacent to a removal side upper portion of an anti-theft U-shaped lock.

13. The saddle riding vehicle according to claim 1, wherein the lateral asking section is formed integrally with the support sections on which the riding seat is mounted.

14. A helmet holder adapted to be used with a saddle riding vehicle, comprising:
    a riding seat removably mounted relative to a vehicle body frame;

a hook section for releasably holding a helmet, said hook section being disposed at a substantially central position in a vehicle width direction on the vehicle body frame;

a lateral masking section for covering at least vehicle lateral outer sides of the hook section; and an upward masking section for covering the hook section from above, wherein the riding seat includes a front seat disposed on a forward side of the vehicle and a rear seat disposed on a rearward side of the vehicle, the front seat and the rear seat being disposed on vertical levels different from each other, the hook section being disposed between the front and rear seats; and the lateral masking section is formed on one of the front or rear seat whichever is disposed on a lower level, and the upward masking section is formed on one of the front or rear seat whichever is disposed on a higher level.

15. The helmet holder adapted to be used with a saddle riding vehicle according to claim 14, wherein the lateral masking section is formed integrally with a seat bottom plate of the riding seat.

16. The helmet holder adapted to be used with a saddle riding vehicle according to claims 14, wherein the hook section is disposed on a cross member extending in the vehicle width direction of the vehicle body frame.

17. The helmet holder adapted to be used with a saddle riding vehicle according to claim 14, wherein the lateral masking section is covered in a vehicle body cover on the vehicle lateral outer sides.

18. The saddle riding vehicle according to claim 14, and further including:

support sections disposed on both vehicle lateral sides of the hook section, the support sections each including:

a front seat mounting portion for mounting the front seat;

a rear cover mounting portion on which a rear cover is mounted; and a rear seat inserting portion over which the rear seat is inserted.

19. The saddle riding vehicle according to claim 14, wherein the support sections are each formed by bending a plate-like member.

* * * * *